United States Patent
Tiirola et al.

(10) Patent No.: US 10,581,584 B2
(45) Date of Patent: Mar. 3, 2020

(54) NR PUCCH COVERAGE EXTENSION

(71) Applicant: Nokia Solutions and Networks Oy, Espoo (FI)

(72) Inventors: Esa T. Tiirola, Kempele (FI); Kari P. Pajukoski, Oulu (FI); Sami-Jukka Hakola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/720,342

(22) Filed: Sep. 29, 2017

(65) Prior Publication Data

US 2018/0097609 A1 Apr. 5, 2018

Related U.S. Application Data (60) Provisional application No. 62/402,167, filed on Sep. 30, 2016.

(51) Int. Cl.
*H04L 5/14* (2006.01)
*H04L 1/18* (2006.01)
(Continued)

(52) U.S. Cl.
CPC .......... *H04L 5/1461* (2013.01); *H04L 1/1861* (2013.01); *H04L 5/0023* (2013.01); *H04L 5/0053* (2013.01); *H04L 5/0055* (2013.01); *H04L 5/0057* (2013.01); *H04L 5/0091* (2013.01); *H04L 5/143* (2013.01);
(Continued)

(58) Field of Classification Search
CPC ... H04L 5/1461; H04L 5/0055; H04L 5/0057; H04L 5/1469; H04L 1/1861; H04L 5/0023; H04L 5/0053; H04L 5/0091; H04L 5/143; H04L 1/1664; H04L 1/1671;
(Continued)

(56) References Cited

U.S. PATENT DOCUMENTS

2013/0039307 A1* 2/2013 Han ................... H04L 1/1861
370/329
2017/0163388 A1* 6/2017 Wiemann ............ H04L 1/1861
(Continued)

FOREIGN PATENT DOCUMENTS

EP 3057245 A1 8/2016

OTHER PUBLICATIONS

Huawei et al, R1-166154, UCI on sPUSCH, 3GPP TSG RAN WG1 Meeting #86, Gothenburg, Sweden, Aug. 22-26, 2016.
(Continued)

*Primary Examiner* — Jung Liu
(74) *Attorney, Agent, or Firm* — Harrington & Smith (57) ABSTRACT

Methods, apparatuses, and computer programs for NR PUCCH coverage extension are disclosed. A plurality of slots to be allocated for a user equipment may be determined by a base station. One or more control data blocks in one or more of the slots may be mapped to at least one of: a short physical uplink control channel and a long physical uplink control channel based on a type of the one or more slots, wherein the type of the slots includes one of: an uplink-only slot; a bi-directional, uplink slot; and a bi-directional, downlink slot. The plurality of slots may be allocated to the user equipment, and uplink control information on the one or more control data blocks may be received from the user equipment.

20 Claims, 7 Drawing Sheets

(51) Int. Cl.
*H04L 5/00* (2006.01)
*H04W 72/04* (2009.01)
*H04W 72/12* (2009.01)
*H04L 1/16* (2006.01)

(52) U.S. Cl.
CPC ....... *H04L 5/1469* (2013.01); *H04W 72/0413* (2013.01); *H04W 72/1268* (2013.01); *H04L 1/1664* (2013.01); *H04L 1/1671* (2013.01); *H04L 5/0044* (2013.01); *H04L 5/0087* (2013.01); *H04W 72/1263* (2013.01)

(58) Field of Classification Search
CPC ............... H04L 5/0044; H04L 5/0087; H04W 72/1268; H04W 72/0413; H04W 72/1263
See application file for complete search history.

(56) References Cited

U.S. PATENT DOCUMENTS

| | | | |
|---|---|---|---|
| 2017/0164352 A1* | 6/2017 | Yang | H04L 5/0053 |
| 2017/0215206 A1* | 7/2017 | Cheng | H04W 74/0816 |
| 2018/0076917 A1* | 3/2018 | Pan | H04B 7/0639 |
| 2018/0176909 A1* | 6/2018 | Wikstrom | H04W 72/0446 |
| 2018/0294938 A1* | 10/2018 | Munier | H04L 1/1812 |
| 2018/0310290 A1* | 10/2018 | Shimezawa | H04L 5/0055 |

OTHER PUBLICATIONS

3GPP TR 38.913 V0.4.0 (Jun. 2016); "3rd Generation Partnership Project; Technical Specification Group Radio Access Network; Study on Scenarios and Requirements for Next Generation Access Technologies; (Release 14)"; Jun. 2016; whole document (35 pages).

NTT DOCOMO: "New SID Proposal: Study on New Radio Access Technology"; RP-160671, 3GPP TSG RAN Meeting #71, Göteborg, Sweden; Mar. 2016; whole document (8 pages).

MCC Support: "Draft Report of 3GPP TSG RAN WG1 #86 v0.1.0 (Gothenburg, Sweden, Aug. 22-26, 2016)"; R1-16xxx, 3GPP TSG RAN WG1 Meeting #86bis, Lisbon, Portugal, Oct. 10-14, 2016; whole document (143 pages).

MCC Support; "Draft Report of 3GPP TSG RAN WG1 #86 v0.2.0 (Gothenburg, Sweden, Aug. 22-26, 2016)"; R1-16xxx, 3GPP TSG RAN WG1 Meeting #86bis, Lisbon, Portugal, Oct. 10-14, 2016; whole document (153 pages).

* cited by examiner

NR PUCCH COVERAGE EXTENSION

CROSS-REFERENCE TO RELATED APPLICATIONS

The present application claims the benefit of U.S. Provisional Patent Application No. 62/402,167, filed on Sep. 30, 2016, the disclosure of which is hereby incorporated by reference in its entirety.

TECHNICAL FIELD

This invention relates generally to wireless communication systems, and, more specifically, relates to extending uplink control (UL) channel coverage for future wireless communication systems.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Recently, the 3rd Generation Partnership Project (3GPP) has approved a study item relating to develop the requirements and specification for new radio (NR) systems. See the following document RP-160671, *New SID Proposal: Study on New Radio Access Technology*, 3GPP TSG RAN Meeting #71, Göteborg, Sweden, 7-10 Mar. 2016). An objective of the study item is to identify and develop technology components needed for NR systems being able to use any spectrum band ranging at least up to 100 GHz. The goal of the study item is to achieve a single technical framework addressing all usage scenarios, requirements and deployment scenarios as defined in 3GPP TR38.913.

One area related to this study item is the physical layer design for physical uplink control channel (PUCCH). The PUCCH, which carries UL control information such as HARQ-ACK and/or CSI via UL channel(s), should support the improvements being made for NR systems. In particular, PUCCH coverage needs to be extended for NR systems.

BRIEF SUMMARY

This section is intended to include examples and is not intended to be limiting.

In an example of an embodiment, a method is disclosed that includes determining, by a base station of a wireless network, a plurality of slots to be allocated for a user equipment; mapping one or more control data blocks in one or more of the slots to at least one of: a short physical uplink control channel and a long physical uplink control channel based on a type of the one or more slots, wherein the type of the slots comprises one of: an uplink-only slot; a bi-directional, uplink slot; and a bi-directional, downlink slot; allocating, to the user equipment, the plurality of slots; and receiving, from the user equipment, uplink control information on the one or more control data blocks.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to at least: determine, by a base station of a wireless network, a plurality of slots to be allocated for a user equipment; map one or more control data blocks in one or more of the slots to at least one of: a short physical uplink control channel and a long physical uplink control channel based on a type of the one or more slots, wherein the type of the slots comprises one of: an uplink-only slot; a bi-directional, uplink slot; and a bi-directional, downlink slot; allocate, to the user equipment, the plurality of slots; and receive, from the user equipment, uplink control information on the one or more control data blocks In another example of an embodiment, an apparatus comprises means for determining, by a base station of a wireless network a plurality of slots to be allocated for a user equipment; means for mapping one or more control data blocks in one or more of the slots to at least one of: a short physical uplink control channel and a long physical uplink control channel based on a type of the one or more slots, wherein the type of the slots comprises one of: an uplink-only slot; a bi-directional, uplink slot; and a bi-directional, downlink slot; means for allocating, to the user equipment, the plurality of slots; and means for receiving, from the user equipment, uplink control information on the one or more control data blocks.

In another example of an embodiment, a method is disclosed that includes receiving, by a user equipment, a plurality of slots allocated for the user equipment; determining, for one or more slots, one or more control data blocks allocated for at least one of: a short physical uplink control channel and a long physical uplink control channel based at least on whether the slot is a downlink-only slot; an uplink-only slot; a bi-directional, uplink slot; and a bi-directional, downlink slot; transmitting uplink control information on the one or more control data blocks.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code we configured to, with the one or more processors, cause the apparatus to at least: receive, by a user equipment, a plurality of slots allocated for the user equipment; determine, for one or more slots, one or more control data blocks allocated for at least one of: a short physical uplink control channel and a long physical uplink control channel based at least on whether the slot is a downlink-only slot; an uplink-only slot; a bi-directional, uplink slot; and a bi-directional, downlink slot; and transmit uplink control information on the one or more control data blocks.

In another example of an embodiment, an apparatus comprises means for receiving, by a user equipment, a plurality of slots allocated for the user equipment; means for determining, for one or more slots, one or more control data blocks allocated for at least one of: a short physical uplink control channel and a long physical uplink control channel based at least on whether the slot is a downlink-only slot; an uplink-only slot; a bi-directional, uplink slot; and a bi-directional, downlink slot; and means for transmitting uplink control information on the one or more control data blocks.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Although this descriptions generally refers to LTE terms, it should be understood that other terms could be used as well, for example NR_PUCCH.

The exemplary embodiments herein describe techniques for NR PUCCH coverage extension. Additional description of these techniques is presented after a system into which the exemplary embodiments may be used is described.

Figure 1:
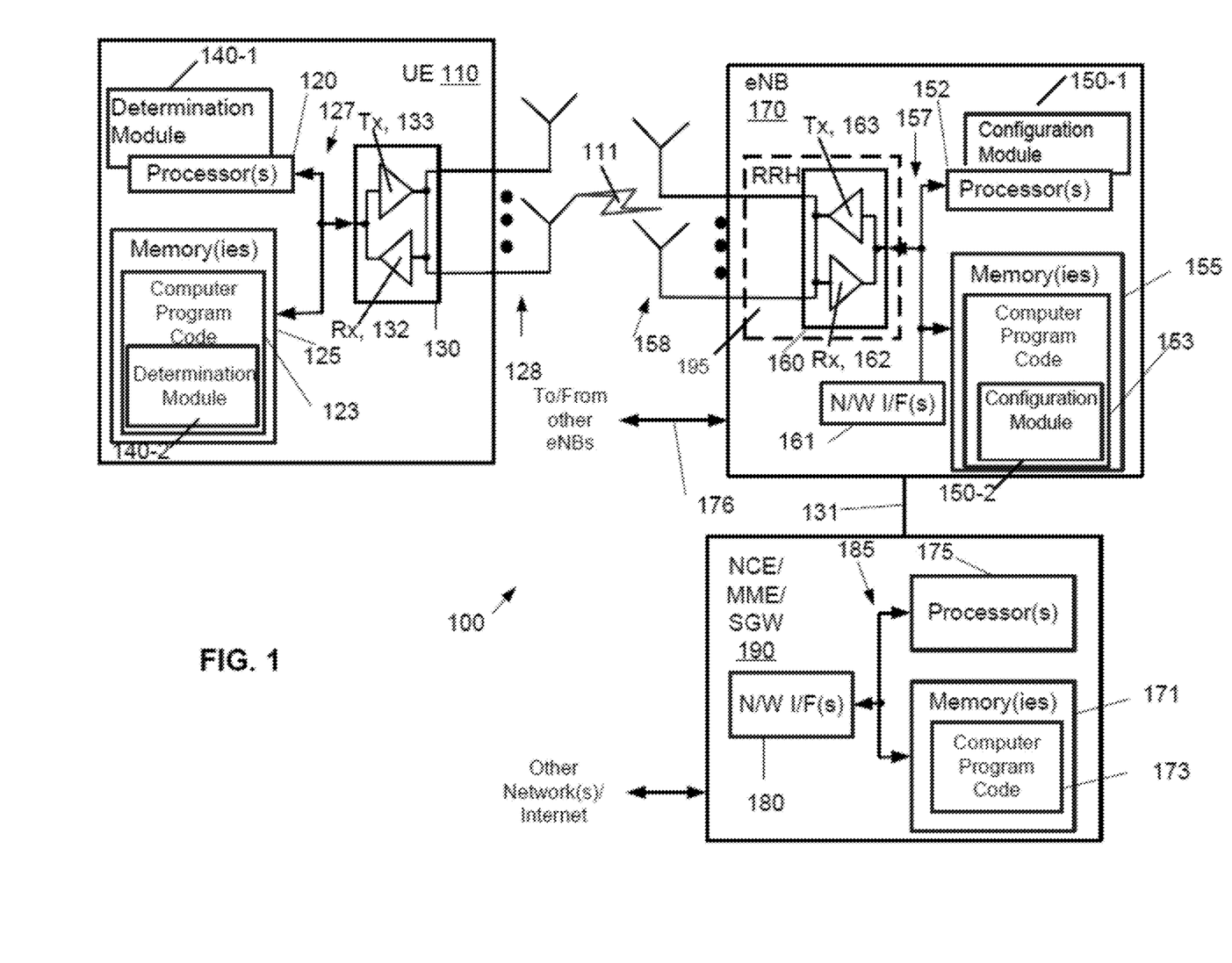
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a determination module 140, comprising one of or both parts 140-1 and/or 140-2, which may be implemented in a number of ways. The determination module 140 may be implemented in hardware as determination module 140-1, such as being implemented as part of the one or more processors 120. The determination module 140-1 may be implemented also as an integrated circuit or through other hardware such as a programmable gate array. In another example, the determination module 140 may be implemented as determination module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a configuration module 150, comprising one of or both parts 150-1 and/or 150-2, which may be implemented in a number of ways. The configuration module 150 may be implemented in hardware as configuration module 150-1, such as being implemented as part of the one or more processors 152. The configuration module 150-1 may be implemented also as an integrated circuit or through other hardware such as a programmable gate array. In another example, the configuration module 150 may be implemented as configuration module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there a three 120 degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

The term 'subframe' is used herein to indicate a regular scheduling unit in time, e.g., in an NR system. It is noted that the specific terms for NR have not yet been established, therefore 'subframe' should not be seen as limiting. For example, the term 'slot' may also be used to indicate a regular scheduling unit in time. Furthermore, the subframe (slot) may be divided into smaller scheduling units in time. These may be referred to as mini-slots.

The basic NR frame structure forms the boundary conditions for the UL control channel design. In RAN1 #86 (see RAN1 Chairman's Notes, 3GPP TSG RAN WGI Meeting #86, 3PGG), the following agreements related to slot structure were made:
  Slot of duration y OFDM symbols in the numerology used for transmission;
  An integer number of slots fit within one subframe duration (at least for subcarrier spacing that is larger than or equal the reference numerology);
  The structure allows for ctrl at the beginning only,
  The structure allows for ctrl at the end only,
  The structure allows for ctrl at the end and at the beginning;
  Other structure is not precluded; and
  One possible scheduling unit.

Figure 2:
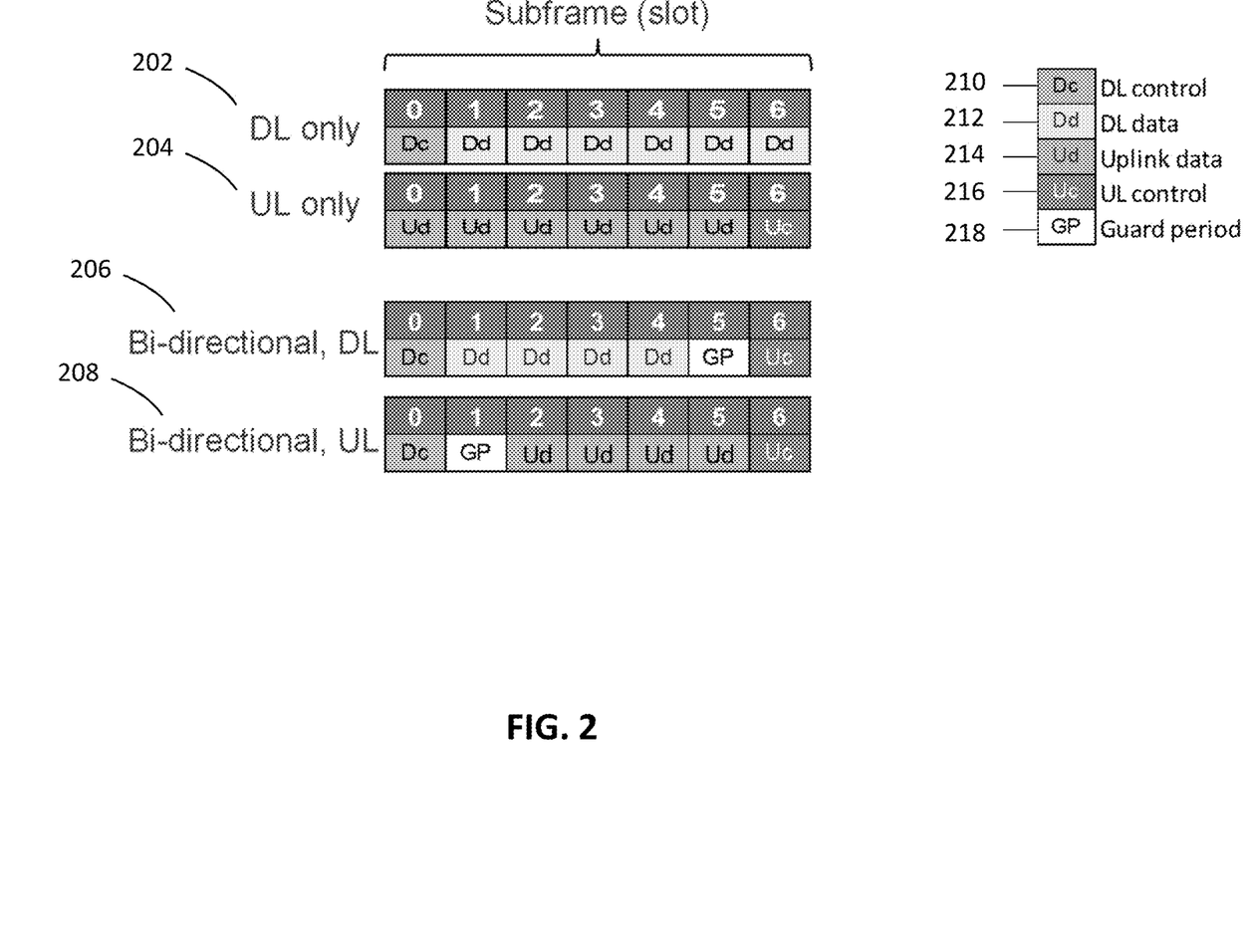
FIG. 2 shows types of subframes in accordance with exemplary embodiments.

Referring now to FIG. 2, this figure illustrates example types of subframes in accordance with exemplary embodiments. Each of the subframe types shown in FIG. 2 include 7 OFDM symbols (i.e. y=7). The DL-only subframe 202 shown in FIG. 2 includes a downlink control (Dc) symbol 210 at position 0, which is followed by six downlink data (Dd) symbols 212 at positions 1-6. The UL-only subframe 204 shown in FIG. 2, includes uplink data (Ud) symbols 214 at positions 0-5 and an uplink control (UC) symbol 216 at position 6. These types of subframes are needed at least in FDD mode, but also in certain TDD scenarios to allow longer transmission periods in a same direction. In order to support smooth coverage extension for a UE, it should be possible to extend the transmission of data and control channels over multiple subframes.

FIG. 2 also shows a bi-directional, DL subframe 206. The bi-directional, DL subframe 206 includes a Dc symbol 210 at position 0, four Dd symbols 212 at positions 1-4, a guard period (OP) symbol 218 at position 5, and an Uc symbol 216 at position 6. Finally, FIG. 2 also shows a bidirectional, UL subframe 208 which includes a Dc symbol 210 at position 0, a GP symbol 218 at position 1, four Ud symbols 214 at positions 2-5, and a Uc symbol 216 at position 6. As can be seen the bi-directional type of subframes include either downlink data or uplink data transmission in each subframe, as well as the corresponding downlink and uplink control. The bi-directional subframes 206, 208 facilitate many crucial TDD functionalities in the NR frame structure, such as:
  Link direction switching between DL and UL;
  Fully flexible traffic adaptation between DL and UL; and
  Opportunity for low latency, provided that subframe length is selected to be short enough.

These subframe types provide the basic support for both time division duplex (TDD) and frequency division duplex (FDD). In all subframes, multiplexing between DL control, DL/UL data, OP and UL control is based on time division multiplexing which allows fast energy efficient pipeline processing of control and data in the receiver. Physical Uplink Control Channel (PUCCH) is conveyed in the Uc control symbol(s) 216 located at the end of the subframes. It should be possible to carry different uplink control information (UCI) types such as HARQ feedback, scheduling request, CSI feedback and their combinations via PUCCH. Additionally, it should be possible to multiplex PUCCH with sounding reference signal (SRS) within the UL control symbol(s) 216.

Figure 3:
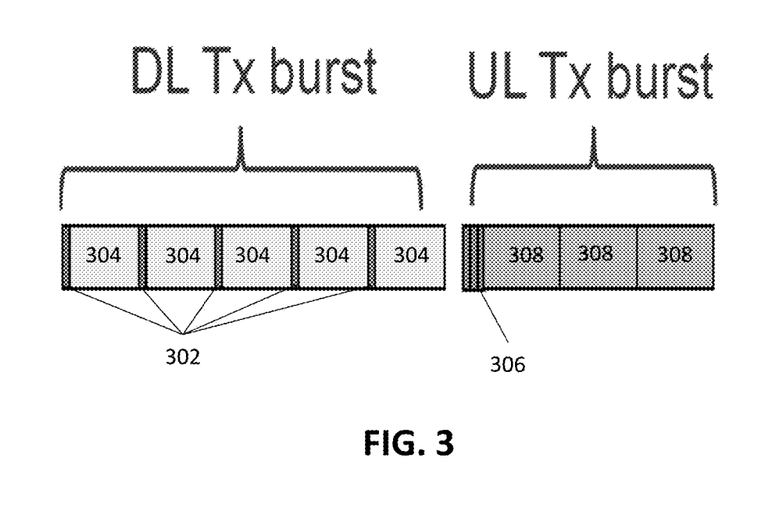
FIG. 3 shows a DL Tx burst and a UL Tx burst based on a MulteFire Alliance scenario.

Some implementations of PUCCH have been discussed in the context of Multefire (LTE standalone operation on unlicensed band). In a MulteFire Alliance scenario, HARQ-ACK feedback is based mainly on Short PUCCH located right after a DL Tx burst. For instance, FIG. 3 shows a DL transmission burst which includes subframes for the PDCCH 302 and PDSCH 304, which is follows by UL Tx burst. The UL Tx burst in FIG. 3 includes a Short PUCCH 306 which is up-to four SC-FDMA symbols and followed by PUSCH subframes 308. The Multefire supports also another container for UCI, namely so called ePUCCH, triggered by eNB. The duration of ePUCCH is one subframe (1 ms) and it utilizes one or more PUSCH interlaces consisting of 10 PRBs interleaved over the entire system bandwidth. The motivation of ePUCCH is to provide an opportunity for eNB to poll pending HARQ-ACKs e.g. due to the fact that negative LBT may have prevented certain UE to send HARQ-ACK via regular sPUCCH. The functionality defined in Multefire does not apply to such situations where Long PUCCH and Short PUCCH exist in parallel in the same subframe as is the case for NR system scenarios described herein.

Forward compatibility forms another set of requirements for control channel design. These requirements include:
  Defining downlink and uplink control (and data channels) as well as reference signals in block based manner;
  Allocation of DMRS and CSI acquisition signals in UE specific manner;
  Confining DMRS for the physical channel inside the resource allocation region of the channel.

Based on those requirements, a UE should be able to transmit certain UL control channel using a narrow subband of the entire system bandwidth.

One challenge with the NR frame structure represented in FIG. 2 is that UL control channel coverage may not be sufficient for all scenarios. For example, in LTE, the PUCCH duration is one millisecond whereas in the subframe types shown in FIG. 2, the PUCCH duration is just one OFDMA symbol. It is preferable that the NR PUCCH would have comparable UL coverage as compared to LTE. Another problem introduced with NR systems is bow to extend PUCCH opportunities within a subframe when operating according to analog/hybrid beamforming architecture at the BS.

Figure 4:
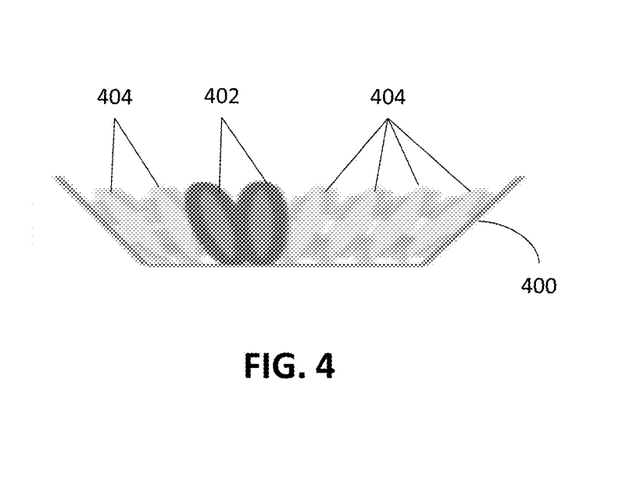
FIG. 4 shows an example of beamforming of RF beams of a BS in accordance with exemplary embodiments.

The beamforming architecture used in the BS also needs to be taken into account in the UL control channel design. Typical characteristics for hybrid beamforming operating with limited number of RF beams in parallel is that the beams can cover only portion of the cell coverage at a time. Referring to FIG. 4, this figure shows an example of beamforming of RF beams of a BS. In this example, there are eight possible beams 402, 404 that the BS can form for the portion of the cell 400. In this example, the BS has capability to form two RF beams at a time, and thus provides coverage for the portion of the cell 400 corresponding to the two beams 402. The narrower the beam the less UEs can share the same beam. Thus given the low number of available high accuracy and large bandwidth TXRUs, the multiplexing capacity will be limited by the number of TXRUs.

Considering uplink control channel reception, and taking into account the hardware limitation, it should be possible to configure multiple UL control symbols per subframe. There also should be an opportunity for RF beam switching between consecutive UL control symbols. On the other hand, if the number of multiplexed UEs per symbol is small (due to, for example, a hardware limit), each UE could occupy a large number of resource elements in frequency.

When operating with a digital beamforming architecture or with a digital RX subsystem along with the main hybrid RX system, a BS can process PUCCH from the whole sector at once with high enough array gain and high DoA resolution capabilities. Digital beamforming architecture benefits from the following design principles:
  Transmission bandwidth of the UL control signal and demodulation RS significantly smaller than system bandwidth
  Efficient multiplexing between narrowband control signals and other/wideband signals (potentially received using hybrid architecture).

Hence, in order to maximize the capabilities of digital beamforming architecture/subsystem, the PUCCH and related RS structures may be defined in a way that allows optimizing BS hybrid implementation with full digital RX subsystem:
  narrowband signal structures with flexible allocation and scheduling possibility
  signal design to enable high multiplexing capability for the control signals like scheduling request.

According to an example embodiment, the PUCCH comprises K parallel resource block groups (RBGs), a.k.a. PUCCH resource units, each consisting of M physical resource blocks (PRBs). Accordingly, each PUCCH RBG consists of M*N subcarriers. A PUCCH RBG may be considered the minimum amount of resources allocated to a user equipment for the PUCCH. In an example embodiment, M may equal 4 or 8, for example, and N may equal 12. The number of PUCCH RBGs depends on the system bandwidth as well as parameters M and N.

Figure 5:
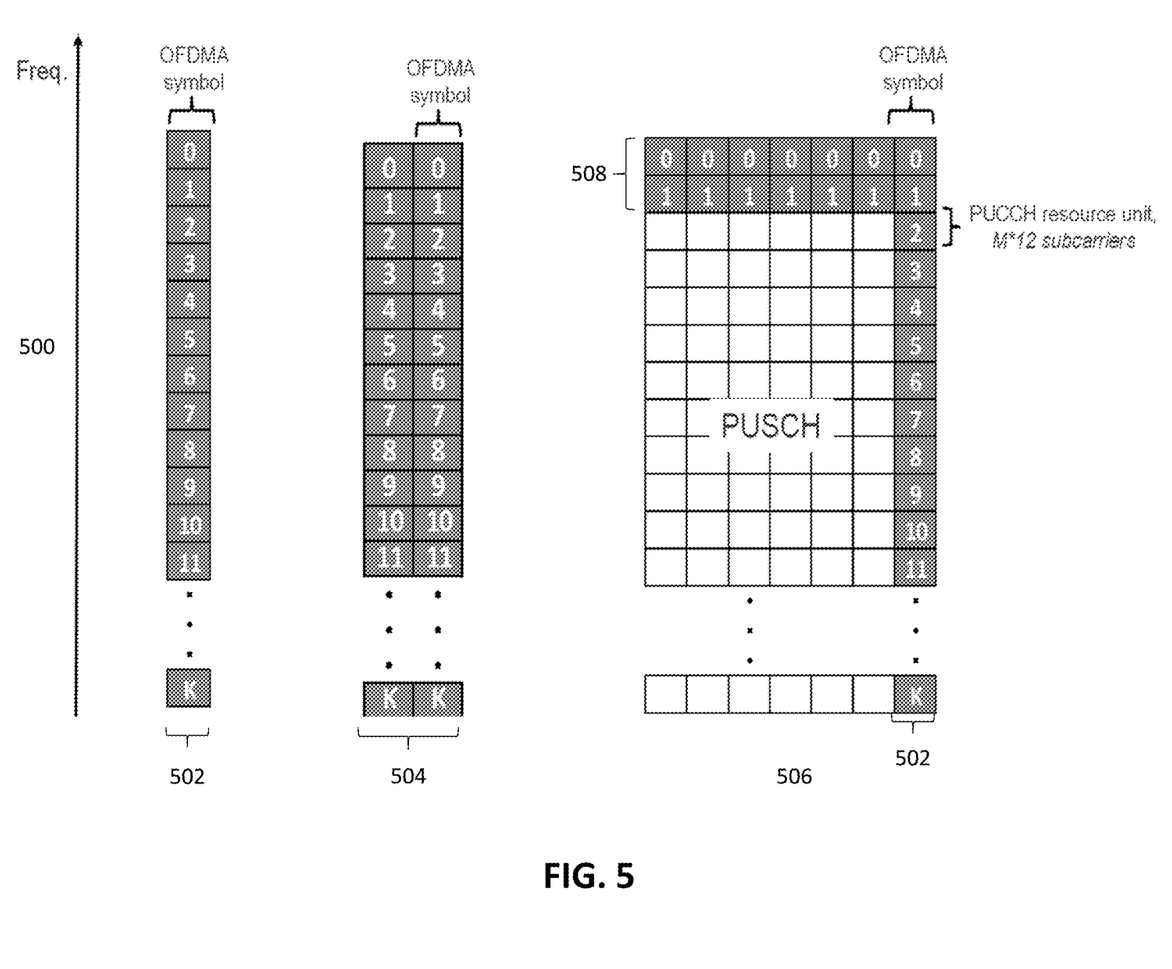
FIG. 5 shows examples of different PUCCH resource unit scenarios in accordance with exemplary embodiments.

Referring now to FIG. 5, this figure shows examples of different PUCCH resource unit scenarios in accordance with exemplary embodiments. In FIG. 5, the frequency band 500 is divided into K parallel PUCCH resource units and it is assumed that the number of subcarriers per PRB is 12. It makes sense to have equal number of subcarriers per PRB for both control and data channels. The number of subcarriers per PUCCH resource unit is equal to M*12. In the scenario shown on the left a Short PUCCH 502 having one OFDMA symbol is shown; the middle scenario shows an option having Short PUCCH 504 including two OFDMA symbols; and the example scenario 506 on the right includes both a Short PUCCH 502 with one OFDMA symbol and Long PUCCH 508 with seven OFDMA symbols and two PUCCH resource units. Long PUCCH is available only for slot types supporting UL data transmission (denoted as PUCCH in FIG. 5).

A UE transmits information via PUCCH using one or more PUCCH resource units at a time. In order to maximize the multiplexing capacity, multiplexing of UEs within a PUCCH resource unit should be supported. For example, it should be possible to use one PUCCH resource unit of Short PUCCH for conveying, sounding reference signal(s), scheduling request(s) and/or small HARQ payload(s) for multiple UEs. It should also be possible to multiplex UEs with larg(er) PUCCH payload within one PUCCH resource unit of Long PUCCH.

According to exemplary embodiments, availability and duration of the PUCCH is defined based on the subframe type. For example, depending on the type of subframe: a Short PUCCH may be available (such as Short PUCCH 502 or Short PUCCH 504 for example); a Long PUCCH (such as Long PUCCH 508 may be available for example); both short and Long PUCCH may be available; or no PUCCH may be available. According to one example, the availability and duration of the PUCCH may be defined as follows:

- For DL-only subframe type, no PUCCH is available;
- For bi-directional DL subframe type, only Short PUCCH is available;
- For bi-directional UL subframe type, both Long PUCCH and Short PUCCH are available; and
- For UL-only subframe type, then both Long PUCCH and Short PUCCH are available.

For the bi-directional UL subframe type and UL-only subframe types above, the selection between Long PUCCH and Short PUCCH may depend on a configuration of the subframe and predefined rules, which are discussed in more detail below.

Figure 6:
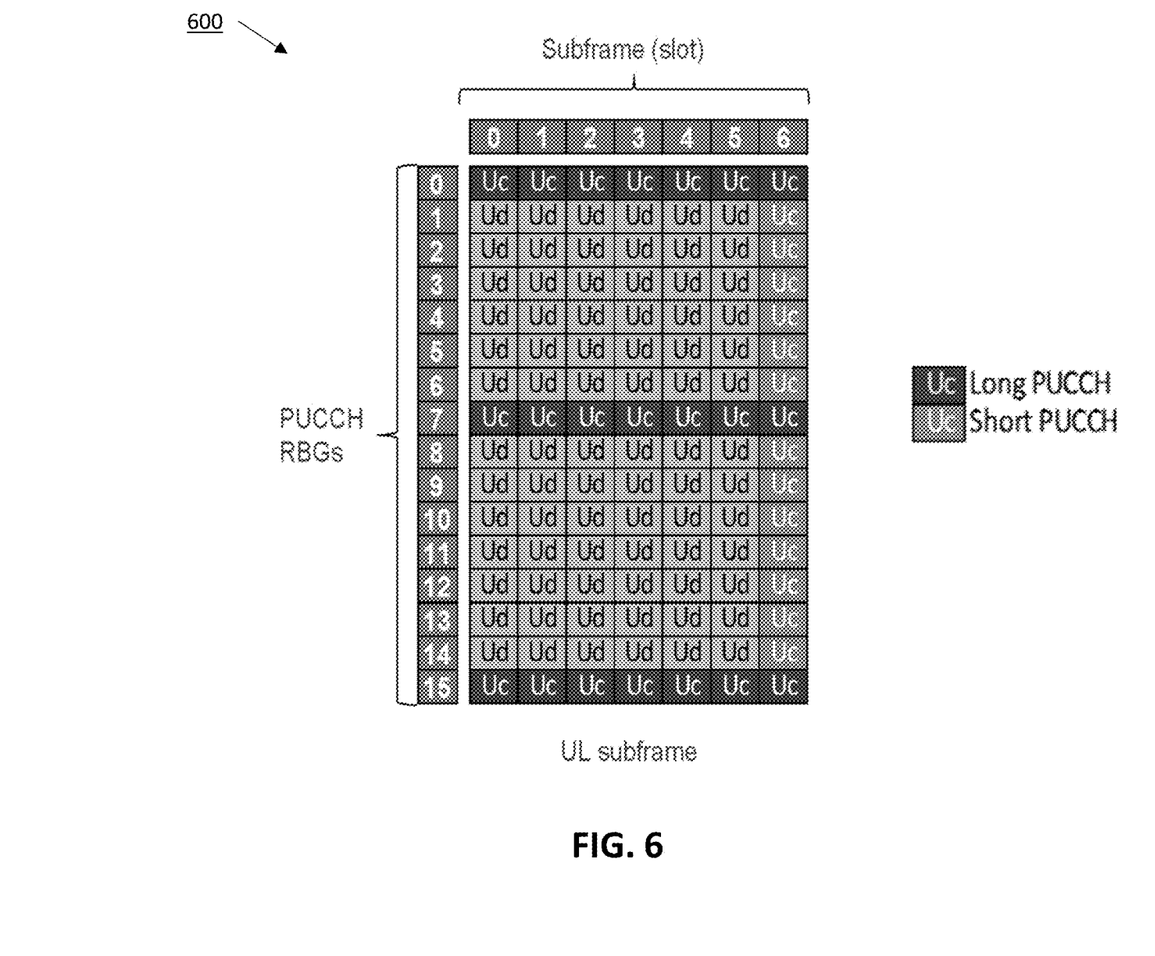
FIG. 6 shows another example of multiplexing between UL subframe data (Ud), Long PUCCH and Short PUCCH for UL-only type subframes in accordance with exemplary embodiments.

Referring now to FIG. 6, this figure shows an example of multiplexing between UL data (Ud), Long PUCCH and Short PUCCH for UL-only type subframes. In the example shown in FIG. 6, the UL subframe 600 comprises 16 parallel PUCCH RBGs. The PUCCH RBGs that correspond to number 0, 7, and 15 are assigned for Long PUCCH (in the current exemplary embodiment) and the other PUCCH RBGs are Short PUCCH.

Figure 7:
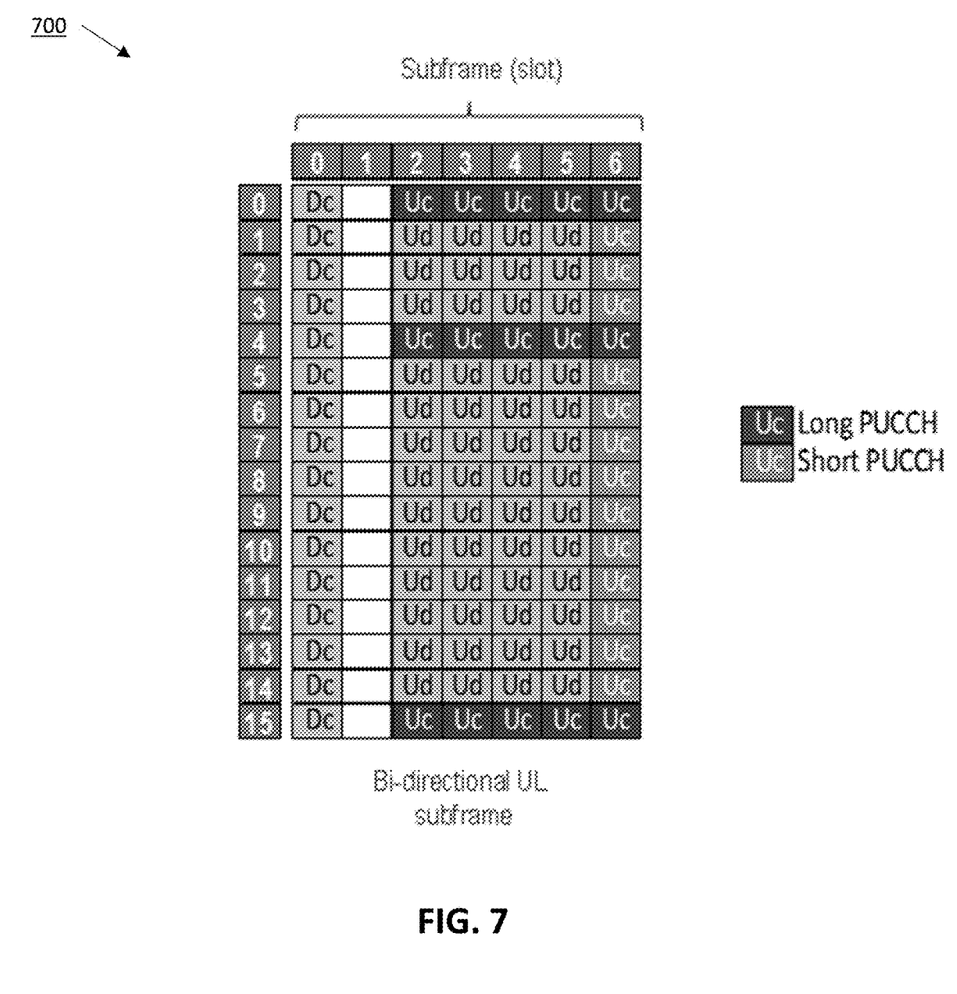
FIG. 7 shows an example of multiplexing between UL subframe data (Ud), Long PUCCH and Short PUCCH for bi-directional UL type subframes in accordance with exemplary embodiments.

Referring now to FIG. 7, this figure shows another example of multiplexing between UL subframe data (Ud), Long PUCCH and Short PUCCH for bi-directional UL type subframes. In the example shown in FIG. 7, the bidirectional UL subframe 700 comprises 16 parallel PUCCH RBGs. In this example, the first OFDMA symbol in each PUCCH RBG is a downlink control symbol which is followed by a guard period. The PUCCH resource unit (RBG) numbered 0, 4, and 15 each include a Long PUCCH after the guard period. The other subframes each have 4 OFDMA uplink data symbols and end with a Short PUCCH.

The Long PUCCH may be characterized, for example as follows:
- UE is configured to use one or more predetermined PUCCH RBGs for transmitting (short/long) PUCCH;
- FDM multiplexing is applied between Long PUCCH, Short PUCCH and PUSCH. In addition, Short PUCCH and Long PUCCH may also be time division multiplexed.
- Long PUCCH is available only in subframes with opportunity for PUSCH allocation. The number of symbols available for Long PUCCH equals to that of PUSCH allocation.

The selection between Long PUCCH and Short PUCCH may be made, for example, according to various predefined rules. For example, the selection between Long PUCCH and Short PUCCH may be made via dedicated higher layer signaling (such as RRC). The configuration may apply to all UCI types. In other words, if a UE is configured to use Long PUCCH, it may use it for all UCI types.

Another possibility is to make a connection between PUCCH RBG (PUCCH resource unit) and PUCCH type (i.e. Long PUCCH and Short PUCCH) in a predetermined way. An example is shown in FIG. 5 (506). Following this approach, a PUCCH resource unit is selected via explicit signaling (such as signaling included in the DCI, or via explicit higher layer signaling). The selection may include implicit info about the PUCCH type according to predefined configuration of PUCCH RBGs with Long PUCCH (and Short PUCCH). The configuration may be done by higher layer signaling (cell specific or dedicated). For example, if PUCCH RBG #1 being configured as RBG with Long PUCCH is selected, it will automatically follow Long PUCCH configuration, provided that the subframe supports PUSCH transmission. On the other hand, if PUCCH RBG #4 being configured for Short PUCCH is selected, it will always follow Short PUCCH configuration.

Yet another possibility, is to define PUCCH type separately for different UCI types (SR, HARQ-ACK, CSI). For example, a scheduling request may apply Short PUCCH whereas HARQ-ACK and CQI may apply Long PUCCH, respectively.

Another example is to define a certain threshold, for example, x bits where UCI payloads≤x bits apply a Short PUCCH and where UCI payload>x bits apply a Long PUCCH, respectively. Yet another option is select PUCCH format explicitly (dynamically) via DL grant triggering PUCCH transmission.

In an example embodiment, a UCI profile is changed according to the availability of Long PUCCH. For example, Short PUCCH may apply HARQ/ACK bundling whereas Long PUCCH may support HARQ-ACK transmission without bundling. The supported UCI payload may also depend on the availability of Long PUCCH. For example, Long PUCCH could support multiplexing of CSI and HARQ-ACK in the same subframe whereas in the case when Long PUCCH is not available, CSI is dropped and HARQ-ACK only is transmitted via Short PUCCH.

In an example embodiment, selection between a short PUCCH and a long PUCCH has a connection to UE processing time. If the UE utilizes Short PUCCH for HARQ-ACK feedback, the minimum processing time may be equal to k subframes (slots). For instance, if HARQ-ACK is transmitted via short PUCCH in subframe n, the corresponding DL data is transmitted at least k subframes earlier (i.e. in subframe n−k) whereas if HARQ-ACK is transmitted via long PUCCH in subframe n, the corresponding DL data is transmitted at least k+1 subframes earlier (i.e. in subframe n−k−1), wherein parameter k corresponds to a minimum HARQ-ACK processing time for the UE.

In one example embodiment, Long PUCCH allocation may be divided into multiple Short PUCCH allocations to enable e.g. an uplink sweeping type operation where a base station may try different BS beams to get a best alignment for the UE's signal. Correspondingly, the UE would transmit certain Short PUCCH signal multiple times within a Long PUCCH allocation. This means that a UE could be allocated R Short PUCCH allocations within a Long PUCCH allocation using the above described resource allocation methods.

To enable potentially required guard periods for the BS to switch RF from to another, the following guard period methods can be considered: the UE may be allocated Short PUCCH on every second symbol on Long PUCCH allocation region and thus every second symbol would be used as guard for beam switch at BS. The BS may allocate one of its transceiver units for this operation and use other transceiver units and beams to receive UL data or UL Long PUCCH simultaneously in FDM manner. According to another option, a Guard period is considered to be part of the cyclic prefix of the Long PUCCH symbol.

Long PUCCH may support multiple parallel channels within RBG. These can be achieved by means of CDM (e.g.

orthogonal cover code and/or cyclic shifts) or FDM. The transmission may cover one or more predetermined PUCCH RBGs, which may be localized or distributed in the frequency.

Long PUCCH may be used for different UCI scenarios including: Scheduling request (cyclic shifts+orthogonal cover code); ½-bit HARQ/ACK (cyclic shifts+orthogonal cover code); or multiple HARQ/ACK bits based on joint coding (orthogonal code only).

In one example embodiment, Long PUCCH is used only in the case when UE is transmitting uplink control information (UCI). In the case when subframe (slot) contains also uplink data (PUSCH), then UCI is multiplexed with UL data on PUSCH. In another example embodiment, Long PUCCH is used for UCI regardless of the simultaneous PUSCH allocation in the same subframe.

Figure 8:
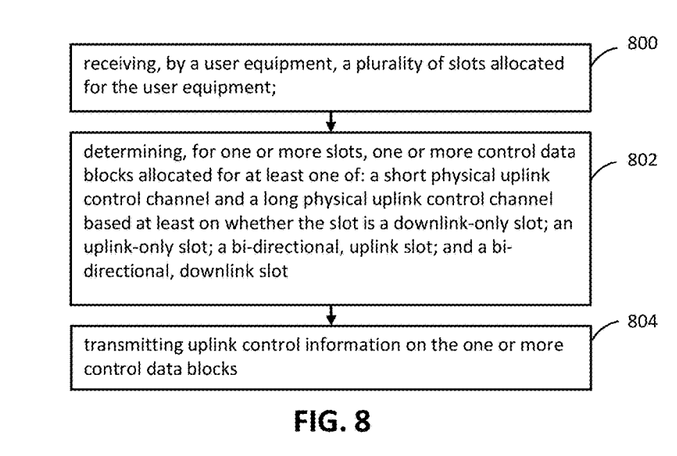
FIGS. 8 and 9 are logic flow diagrams for NR PUCCH coverage extension, and illustrate the operation of exemplary methods, a result of execution of computer program instructions embodied on a computer readable memory, functions performed by logic implemented in hardware, and/or interconnected means for performing functions in accordance with exemplary embodiments.

FIG. 8 is a logic flow diagram for NR PUCCH coverage extension. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the determination module 140 may include multiples ones of the blocks in FIG. 8, where each included block is an interconnected means for performing the function in the block. The blocks in FIG. 8 are assumed to be performed by the UE 110, e.g., under control of the determination module 140 at least in part.

Referring to FIG. 8, according to an example embodiment a method may comprise: receiving, by a user equipment, a plurality of subframes allocated for the user equipment, as indicated by block 800; determining, for one or more subframes, one or more control data blocks allocated for at least one oft a short physical uplink control channel and a long physical uplink control channel based at least on whether the subframe is a downlink-only subframe; an uplink-only subframe a bi-directional, uplink subframe; and a bi-directional, downlink subframe, as indicated by block 802; and transmitting uplink control information on the one or more control data blocks, as indicated by block 804.

The determining may include: determining that no control data blocks are available for a physical uplink control channel for subframes that are downlink-only subframe type; determining that one or more control data blocks for a short physical uplink control channel are available for subframes of a bi-directional, downlink subframe type; and determining that one or more control data blocks for a short physical uplink control channel and a long physical uplink control channel are available for bi-directional, uplink subframes and/or an uplink-only subframes.

The number of control data blocks allocated for the long physical uplink control channel may be equal to a number of data blocks allocated for a physical uplink shared channel.

The method may include: selecting to transmit the uplink control information on the short physical uplink control channel or the long physical uplink control channel based on at least one of: radio resource control signaling received by the user equipment; a type of the uplink control information, wherein the type of uplink control information may include at least one of: a scheduling request (SR), HARQ-ACK, channel state information (CSI); a predefined threshold, such that uplink control information having a payload greater than the predefined threshold may be received on the long physical uplink control channel, and uplink control information having a payload less than the predefined threshold may be received on the short physical uplink control channel; a processing time of the user equipment; and a dynamic downlink trigger received by the base station.

The uplink control information may be at least one of HARQ-ACK and CQI that is transmitted on the long physical uplink control channel, and uplink control information comprising a SR that is transmitted on the long physical uplink control channel.

The method may include selecting to transmit the uplink control information on the short physical uplink control channel or the long physical uplink control channel based on a predefined physical uplink control channel resource block group configuration.

A data block and/or a control data block may be at least one of: an OFDMA symbol, SC-FDMA symbol, and a DFT-S-OFDMA symbol.

The method may include determining control data blocks configured for the long physical uplink control channel comprise multiple short physical uplink control channel allocations; and transmitting from the user equipment, an uplink signal on each of the multiple short physical uplink control channel allocations.

The control data blocks for the multiple short physical control channel allocations may be guard periods between the multiple short physical uplink control channel allocations of the long physical uplink control channel allocation. The method may include receiving downlink data in a physical downlink shared channel, wherein the uplink control information may be a HARQ-ACK and the uplink control information may be transmitted on the short physical uplink control channel or the long physical uplink control channel based on at least one of: a processing time from detection of the physical downlink shared channel to the HARQ-ACK transmission, wherein the uplink control information may be transmitted on the short physical uplink control if the processing time is less than or equal to a minimum processing time, k, and wherein the uplink control information may be transmitted on the long physical uplink control channel if the processing time is greater than k. If the uplink control information is transmitted on the short physical uplink control channel then the downlink data may be received at least k subframes earlier, and if the uplink control information is transmitted on the long physical uplink control channel then the downlink data may be received in at least k+1 subframes earlier.

In another embodiment, an apparatus may include: at least one processor, and at least one non-transitory memory including computer program code, the at least one memory and the computer program code configured to, with the at least one processor, cause the apparatus at least to: receive, by a user equipment, a plurality of subframes allocated for the user equipment, determine, for one or more subframes, one or more control data blocks allocated for at least one of: a short physical uplink control channel and a long physical uplink control channel based at least on whether the subframe is a downlink-only subframe; an uplink-only subframe; a bi-directional, uplink subframe; and a bi-directional, downlink subframe transmit uplink control information on the one or more control data blocks.

The determination may be: determination that no control data blocks are available for a physical uplink control channel for subframes that are downlink-only subframe type; determination that one or more control data blocks for a short physical uplink control channel are available for subframes of a bi-directional, downlink subframe type; and determination that one or more control data blocks for a short physical uplink control channel and a long physical uplink control channel are available for bi-directional, uplink subframes and/or an uplink-only subframes.

A number of control data blocks allocated for the long physical uplink control channel may be equal to a number of data blocks allocated for a physical uplink shared channel.

The at least one memory and the computer program code may be configured to, with the at least one processor, cause the apparatus at least to: select to transmit the uplink control information on the short physical uplink control channel or the long physical uplink control channel based on at least one of: radio resource control signaling received by the user equipment; a type of the uplink control information, wherein the type of uplink control information may be at least one of: a scheduling request (SR), HARQ-ACK, channel state information (CSI); a predefined threshold, such that uplink control information having a payload greater than the predefined threshold is received on the long physical uplink control channel, and uplink control information having a payload less than the predefined threshold is received on the short physical uplink control channel; a processing time of the user equipment; and a dynamic downlink trigger received by the base station.

The uplink control information may be at least one of HARQ-ACK and CQI that is transmitted on the long physical uplink control channel, and uplink control information comprising a SR that is transmitted on the long physical uplink control channel The at least one memory and the computer program code may be configured to, with the at least one processor, cause the apparatus at least to: select to transmit the uplink control information on the abort physical uplink control channel or the long physical uplink control channel based on a predefined physical uplink control channel resource block group configuration.

The at least one of: a data block and a control data block may be: an OFDMA symbol, SC-FDMA symbol, or a DFT-S-OFDMA symbol.

The at least one memory and the computer program code may be configured to, with the at least one processor, cause the apparatus at least to: determine control data blocks configured for the long physical uplink control channel comprise multiple short physical uplink control channel allocations; and transmit, from the user equipment, an uplink signal on each of the multiple short physical uplink control channel allocations.

The control data blocks for the multiple short physical control channel allocations may be guard periods between the multiple short physical uplink control channel allocations of the long physical uplink control channel allocation. The at least one memory and the computer program code may be configured to, with the at least one processor, cause the apparatus at least to: receive downlink data in a physical downlink shared channel, wherein the uplink control information may be a HARQ-ACK and the uplink control information may be transmitted on the short physical uplink control channel or the long physical uplink control channel based on at least one of: a processing time from detection of the physical downlink shared channel to the HARQ-ACK transmission, wherein the uplink control information may be transmitted on the short physical uplink control if the processing time is less than or equal to a minimum processing time, k, and wherein the uplink control information may be transmitted on the long physical uplink control channel if the processing time is greater than k. If the uplink control information may be transmitted on the short physical uplink control channel then the downlink data was received at least k subframes earlier, and if the uplink control information may be transmitted on the long physical uplink control channel then the downlink data was received in at least k+1 subframes earlier.

Figure 9:
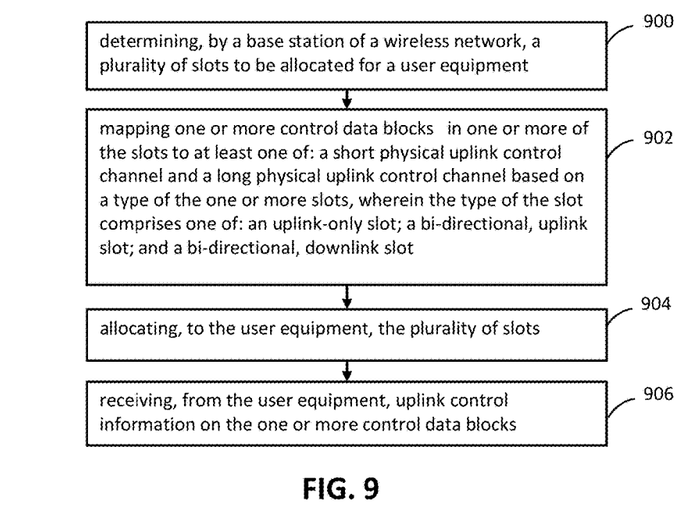

FIG. 9 is a logic flow diagram for NR PUCCH coverage extension. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the configuration module 150 may include multiples ones of the blocks in FIG. 9, where each included block is an interconnected means for performing the function in the block. The blocks in FIG. 9 are assumed to be performed by a base station such as eNB 170, e.g., under control of the configuration module 150 at least in part.

Referring to FIG. 9, a method may comprise: determining, by a base station of a wireless network, a plurality of subframes to be allocated for a user equipment, as indicated by block 900; mapping one or more control data blocks in one or more of the subframes to at least one of: a short physical uplink control channel and a long physical uplink control channel based on a type of the one or more subframes, wherein the type of the subframes may include one of: an uplink-only subframe; a bi-directional, uplink subframe; and a bi-directional, downlink subframe as indicated by block 902; allocating, to the user equipment, the plurality of subframes, as indicated by block 904; and receiving, from the user equipment, uplink control information on the one or more control data blocks, as indicated by block 906.

The bi-directional, downlink subframes may be mapped to the short physical uplink channel; and the bi-directional, uplink subframes and uplink-only subframes may be mapped to at least one of: a short physical uplink control channel and a long physical control channel.

The method may include dividing the control data blocks configured for the long physical uplink control channel into multiple short physical control channel allocations; and receiving, from the user equipment, an uplink signal on each of the multiple abort physical control channel allocations.

The uplink signal may be received on each of the multiple short physical uplink control channel allocations, wherein the method may include: performing, by the base station, uplink sweeping type operation to find the best radio frequency beam for the user equipment.

Dividing the control data blocks configured for the long physical uplink control channel may include configuring guard periods between the multiple short physical uplink control channel allocations of the long physical uplink control channel allocation guard periods to enable the base station to perform RF beam switching between multiple short physical control channel allocations.

Mapping the one or more control data blocks in one or more of the subframes to the at least one of the short physical uplink control channel and the long physical uplink control channel may be based on a predefined physical uplink control channel resource block group configuration.

Mapping the one or more control data blocks in the one or more subframes according to the predefined physical uplink control channel resource block group configuration may include: mapping a long physical uplink control channel for subframes having one or more data blocks mapped to a physical uplink shared channel.

The uplink control information may be received on the short physical uplink control channel or the long physical uplink control channel based on at least one of: the predefined physical uplink control channel resource block group configuration and physical uplink control channel resource block group allocation in the subframe.

The at least one of: a data block and a control data block may be: an OFDMA symbol, SC-FDMA symbol, and/or a DFT-S-OFDMA symbol.

The method may include determining the type of the respective subframe based on at least one of: higher layer signaling and L1 downlink control signaling.

The uplink control information may be received on the short physical uplink control channel or the long physical uplink control channel based on at least one of: radio resource control signaling; L1 downlink control signaling; a type of the uplink control information, wherein the type of uplink control information comprises at least one of: a scheduling request (SR), HARQ-ACK, channel state information (CSI); a predefined threshold, such that uplink control information having a payload greater than the predefined threshold may be received on the long physical uplink control channel, and uplink control information having a payload less than the predefined threshold may be received on the short physical uplink control channel; and a dynamic downlink trigger transmitted by the base station. The uplink control information comprising at least one of HARQ-ACK and CQI may be received on the long physical uplink control channel, and the uplink control information comprising a SR may be received on the long physical uplink control channel.

In another embodiment, an apparatus includes: at least one processor; and at least one non-transitory memory including computer program code, the at least one memory and the computer program code may be configured to, with the at least one processor, cause the apparatus at least to: determine, by a base station of a wireless network, a plurality of subframes to be allocated for a user equipment; map one or more control data blocks in one or more of the subframes to at least one of: a short physical uplink control channel and a long physical uplink control channel based on a type of the one or more subframes, wherein the type of the subframes may include one of: an uplink-only subframe a bi-directional, uplink subframe; and a bi-directional, downlink subframe; allocate, to the user equipment, the plurality of subframes; and receive, from the user equipment, uplink control information on the one or more control data blocks.

The bi-directional, downlink subframes may be mapped to the short physical uplink channel; and the bi-directional, uplink subframe and an uplink-only subframes may be mapped to at least one of: a short physical uplink control channel and a long physical control channel.

The at least one memory and the computer program code may be configured to, with the at least one processor, cause the apparatus at least to: divide the control data blocks configured for the long physical uplink control channel into multiple short physical control channel allocations; and receive, from the user equipment, an uplink signal on each of the multiple short physical control channel allocations.

The uplink signal may be received on each of the multiple short physical uplink control channel allocations, and wherein the at least one memory and the computer program code may be configured to, with the at least one processor, cause the apparatus at least to: perform, by the base station, uplink sweeping type operation to find the best radio frequency beam for the user equipment.

Dividing the control data blocks configured for the long physical uplink control channel may include configuring guard periods between the multiple short physical uplink control channel allocations of the long physical uplink control channel allocation guard periods to enable the base station to perform RF beam switching between multiple short physical control channel allocations.

Mapping the one or more control data blocks in one or more of the subframes to the at least one of the short physical uplink control channel and the long physical uplink control channel may be based on a predefined physical uplink control channel resource block group configuration.

Mapping the one or more control data blocks in the one or more subframes according to the predefined physical uplink control channel resource block group configuration may include: mapping a long physical uplink control channel for subframes having one or more data blocks mapped to a physical uplink shared channel.

Whether the uplink control information may be received on the short physical uplink control channel or the long physical uplink control channel based on at least one of the predefined physical uplink control channel resource block group configuration and physical uplink control channel resource block group allocation in the subframe.

The at least one of: a data block and a control data block may be one of: an OFDMA symbol, SC-FDMA symbol, and/or a DFT-S-OFDMA symbol.

The at least one memory and the computer program code may be configured to, with the at least one processor, cause the apparatus at least to: determine the type of the respective subframe based on at least one of: higher layer signaling and L1 downlink control signaling.

The uplink control information may be received on the short physical uplink control channel or the long physical uplink control channel based on at least one of: radio resource control signaling; L1 downlink control signaling; a type of the uplink control information, wherein the type of uplink control information may be at least one of: a scheduling request (SR), HARQ-ACK, channel state information (CSI); a predefined threshold, such that uplink control information having a payload greater than the predefined threshold may be received on the long physical uplink control channel, and uplink control information having a payload less than the predefined threshold may be received on the short physical uplink control channel; and a dynamic downlink trigger transmitted by the base station.

The uplink control information may be at least one of HARQ-ACK and CQI is received on the long physical uplink control channel, and uplink control information comprising a SR is received on the long physical uplink control channel.

A base station may include an apparatus according to any one of the paragraphs above.

In an embodiment, a user equipment may comprise an apparatus according to any one of the paragraphs above.

In an embodiment, a communication system may include an apparatus in accordance with any one of the claims, and an apparatus in accordance with any one of the paragraphs herein.

In an embodiment, a computer program may include program code for executing the method according to any of the paragraphs herein. The computer program may be a computer program product comprising a computer-readable medium bearing computer program code embodied therein for use with a computer.

In another embodiment, an apparatus may include: means for determining, by a base station of a wireless network, a plurality of subframes to be allocated for a user equipment; means for mapping one or more control data blocks in one or more of the subframes to at least one of: a short physical uplink control channel and a long physical uplink control channel based on a type of the one or more subframes, wherein the type of the subframes may be one of: an uplink-only subframe; a bidirectional, uplink subframe; and a bi-directional, downlink subframe; means for allocating, to the user equipment, the plurality of subframes; and means for receiving, from the user equipment, uplink control information on the one or more control data blocks.

In another embodiment, an apparatus may include means for receiving, by a user equipment, a plurality of subframes allocated for the user equipment, means for determining, for one or more subframes, one or more control data blocks allocated for at least one of: a short physical uplink control channel and a long physical uplink control channel based at least on whether the subframe is a downlink-only subframe; an uplink-only subframe; a bi-directional, uplink subframe; and a bi-directional, downlink subframe; means for transmitting uplink control information on the one or more control data blocks.

Without in any way limiting the scope, interpretation, or application of the claims appearing below, a technical effect of one or more of the example embodiments disclosed herein is improved PUCCH coverage with necessary flexibility and limited overhead increase. Another technical effect of one or more of the example embodiments disclosed herein robust and scalable PUCCH with having UL control channel overhead. Another technical effect of one or more of the example embodiments disclosed herein is allowing comparable PUCCH coverage for NR and LTE. Another technical effect of one or more of the example embodiments disclosed herein is increased PUCCH opportunities within subframe (slot) when operating according to analog/hybrid beamforming architecture at the BS.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
ACK Acknowledgement
CSI Channel Stat Information
DL Downlink
eNB (or eNodeB) evolved Node B (e.g., an LTE base station)
ePUCCH enhanced PUCCH (Multefire term)
FDM Frequency Domain Multiplexing
HARQ Hybrid Automatic Repeat ReQuest
I/F Interface
LBT Listen Before Talk
LTE Long Term Evolution
MME Mobility Management Entity
NACK Negative ACK
NCE Network Control Element
N/W Network
RRH Remote Radio Head
PDCCH Physical Downlink Control Channel
PDSCH Physical Downlink Shared Channel
PUCCH Physical Uplink Control Channel
PUSCH Physical Uplink Shared Channel
RBG Resource Block Group
Rel Release
Rx Receiver
sPUCCH Short PUCCH (Multefire term)
SGW Serving Gateway
SR Scheduling Request
TDM Time Domain Multiplexing
Tx Transmitter
UCI Uplink Control Information
UE User Equipment (e.g., a wireless, typically mobile device)
UL Uplink

What is claimed is:

1. A method, comprising:
determining, by a base station of a wireless network, a plurality of slots to be allocated for a user equipment;
mapping one or more control data blocks in one slot of the plurality of slots to at least one of: a short physical uplink control channel and a long physical uplink control channel that are in a same slot of the plurality of slots based on a type of the one slot, wherein the type of the one slot comprises one of: an uplink-only slot; a bi-directional, uplink slot; or a bi-directional, downlink slot;
allocating, to the user equipment, the plurality of slots; and
receiving, from the user equipment, uplink control information on the one or more control data blocks.

2. The method of claim 1, wherein:
the uplink control information corresponding to bi-directional, downlink slots is received via the short physical uplink control channel; and
uplink control information corresponding to bi-directional, uplink slots and uplink-only slots is received via at least one of: the short physical uplink control channel or the long physical uplink control channel.

3. The method of claim 2, further comprising:
dividing two or more control data blocks configured for the long physical uplink control channel into multiple short physical uplink control channel allocations; and
receiving, from the user equipment, an uplink signal on each of the multiple short physical uplink control channel allocations.

4. The method of claim 3, wherein the uplink signal is received on each of the multiple short physical uplink control channel allocations, wherein the method further comprises:
performing, by the base station, an uplink sweeping type operation to receive the uplink control information from different radio frequency beams.

5. The method of claim 3, wherein dividing the two or more control data blocks configured for the long physical uplink control channel comprises configuring guard periods between the multiple short physical uplink control channel allocations of the long physical uplink control channel allocation guard periods to enable the base station to perform radio frequency beam switching between the multiple short physical uplink control channel allocations.

6. The method of claim 1, wherein the at least one of a short physical uplink control channel or a long physical uplink control channel comprises both a short physical uplink control channel and a long physical uplink control channel that are in parallel in the same slot of the at least one slot of the plurality of slots.

7. The method of claim 1, wherein mapping the one or more control data blocks in the one slot to the at least one of the short physical uplink control channel or the long physical uplink control channel is based on a predefined physical uplink control channel resource configuration, and wherein mapping the one or more control data blocks in the the one slot according to the predefined physical uplink control channel resource configuration comprises:
mapping the long physical uplink control channel for slots having one or more data blocks mapped to a physical uplink shared channel.

8. The method of claim 6, wherein the uplink control information is received on the short physical uplink control channel or the long physical uplink control channel based on at least one of the predefined physical uplink control channel resource configuration or a physical uplink control channel resource allocation in the one slot.

9. A method, comprising:
receiving, by a user equipment, a plurality of slots allocated for the user equipment;
determining, for one slot, one or more control data blocks allocated for at least one of: a short physical uplink control channel and or a long physical uplink control channel that are in a same slot of the plurality of slots based at least on whether the slot is a downlink-only slot; an uplink-only slot; a bi-directional, uplink slot; or a bi-directional, downlink slot; and
transmitting uplink control information on the one or more control data blocks.

10. The method of claim 9, wherein the determining comprises:
determining that no control data blocks are available for a physical uplink control channel for slots that are downlink-only slot type;
determining that one or more control data blocks for a short physical uplink control channel are available for slots of a bi-directional, downlink slot type; and
determining that one or more control data blocks for a short physical uplink control channel and a long physical uplink control channel are available for bi-directional, uplink slots and/or an uplink-only slots.

11. The method of claim 9, wherein a number of control data blocks allocated for the long physical uplink control channel is equal to a number of data blocks allocated for a physical uplink shared channel.

12. The method of claim 9, the method further comprising selecting to transmit the uplink control information on the short physical uplink control channel or the long physical uplink control channel based on at least one of:
radio resource control signaling received by the user equipment, or
a type of the uplink control information, wherein the type of uplink control information comprises at least one of: a scheduling request, hybrid automatic repeat request acknowledgment, or channel state information;
a predefined threshold, such that uplink control information having a payload greater than the predefined threshold is received on the long physical uplink control channel, and uplink control information having a payload less than the predefined threshold is received on the short physical uplink control channel;
a processing time of the user equipment; and
a dynamic downlink trigger received by the base station.

13. The method of claim 12, wherein:
uplink control information comprising at least one of hybrid automatic repeat request acknowledgment or a channel quality indicator is transmitted on the long physical uplink control channel, and
uplink control information comprising the scheduling request is transmitted on the long physical uplink control channel.

14. The method of claim 9, the method further comprising:
selecting to transmit the uplink control information on the short physical uplink control channel or the long physical uplink control channel based on a predefined physical uplink control channel resource configuration.

15. The method of claim 9, further comprising:
determining control data blocks configured for the long physical uplink control channel comprise multiple short physical uplink control channel allocations; and
transmitting, from the user equipment, an uplink signal on each of the multiple short physical uplink control channel allocations.

16. The method of claim 9, wherein the control data blocks for the multiple short physical control channel allocations comprise guard periods between the multiple short physical uplink control channel allocations of the long physical uplink control channel allocation.

17. The method of claim 9, the method further comprising receiving downlink data in a physical downlink shared channel, wherein the uplink control information comprises a hybrid automatic repeat request acknowledgment and the uplink control information is transmitted on the short physical uplink control channel or the long physical uplink control channel based on
a processing time from detection of the physical downlink shared channel to the hybrid automatic repeat request acknowledgment transmission, wherein the uplink control information is transmitted on the short physical uplink control if the processing time is less than or equal to a minimum processing time, k, and wherein the uplink control information is transmitted on the long physical uplink control channel if the processing time is greater than k.

18. The method of claim 17, wherein:
if the uplink control information is transmitted on the short physical uplink control channel then the downlink data was received at least k slots earlier, and
if the uplink control information is transmitted on the long physical uplink control channel then the downlink data was received in at least k+1 slots earlier.

19. An apparatus, comprising:

at least one processor; and at least one non-transitory memory including computer program code, the at least one memory and the computer program code configured to, with the at least one processor, cause the apparatus at least to perform:

receive, by a user equipment, a plurality of slots allocated for the user equipment;

determine, for one slot of the plurality of slots, one or more control data blocks allocated for at least one of: a short physical uplink control channel or a long physical uplink control channel that are in a same slot of the plurality of slots based at least on whether the slot is a downlink-only slot; an uplink-only slot; a bi-directional, uplink slot; or a bi-directional, downlink slot; and     transmit uplink control information on the one or more control data blocks.

20. A computer program product comprising a non-transitory computer-readable medium bearing computer program code which when executed by a computer cause the computer to perform a method according to claim 1.

\* \* \* \* \*

UNITED STATES PATENT AND TRADEMARK OFFICE
CERTIFICATE OF CORRECTION

PATENT NO. : 10,581,584 B2
APPLICATION NO. : 15/720342
DATED : March 3, 2020
INVENTOR(S) : Tiirola et al.

It is certified that error appears in the above-identified patent and that said Letters Patent is hereby corrected as shown below:

In the Claims

Claim 9, Column 19, Line 44 "and" should be deleted in between --channel-- and --or--.

Signed and Sealed this
Fifth Day of May, 2020

Andrei Iancu
*Director of the United States Patent and Trademark Office*